(12) United States Patent
Suzuki et al.

(10) Patent No.: US 11,560,110 B2
(45) Date of Patent: Jan. 24, 2023

(54) COLLISION DETECTING DEVICE

(71) Applicant: DENSO CORPORATION, Kariya (JP)

(72) Inventors: Yoichiro Suzuki, Nisshin (JP); Naohito Takasuka, Nisshin (JP); Takatoshi Sekizawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 661 days.

(21) Appl. No.: 16/593,608

(22) Filed: Oct. 4, 2019

(65) Prior Publication Data

US 2020/0031301 A1 Jan. 30, 2020

Related U.S. Application Data

(63) Continuation of application No. PCT/JP2018/026369, filed on Jul. 12, 2018.

(30) Foreign Application Priority Data

Jul. 13, 2017 (JP) .............................. JP2017-137145

(51) Int. Cl.
*B60R 21/0136* (2006.01)
*B60R 21/38* (2011.01)
*B60R 21/013* (2006.01)
*B60C 19/00* (2006.01)

(52) U.S. Cl.
CPC .......... *B60R 21/0136* (2013.01); *B60R 21/38* (2013.01); *B60C 2019/004* (2013.01); *B60R 2021/01302* (2013.01); *B60R 2021/01304* (2013.01)

(58) Field of Classification Search
CPC combination set(s) only.
See application file for complete search history.

(56) References Cited

U.S. PATENT DOCUMENTS

| | | | | |
|---|---|---|---|---|
| 2010/0030433 | A1* | 2/2010 | Suzuki | B60R 21/0136 701/45 |
| 2011/0153262 | A1* | 6/2011 | Furuta | B60R 21/34 702/141 |
| 2012/0078499 | A1* | 3/2012 | Park | B60R 21/0136 701/301 |
| 2013/0116972 | A1* | 5/2013 | Hanatsuka | B60W 40/06 702/167 |
| 2013/0317702 | A1* | 11/2013 | Kobayashi | B60R 21/0132 701/46 |

(Continued)

FOREIGN PATENT DOCUMENTS

| | | |
|---|---|---|
| EP | 2093109 A2 | 8/2009 |
| JP | 2015174638 A | 10/2015 |
| JP | 2015221592 A | 12/2015 |

*Primary Examiner* — Anne Marie Antonucci
*Assistant Examiner* — Amelia Vorce
(74) *Attorney, Agent, or Firm* — Harness, Dickey & Pierce, P.L.C.

(57) ABSTRACT

A collision detection unit corrects a threshold value to a larger value, which a collision check unit uses to compare an output value of a collision detection unit, in case of a rough road surface than in case of a flat road surface. Thus, it becomes possible to suppress erroneous detection on the rough road surface while detecting a collision sensitively on a flat road surface. The rough road is detected by a vibration detection unit provided in a tire side device.

10 Claims, 5 Drawing Sheets

(56) References Cited

U.S. PATENT DOCUMENTS

| | | | |
|---|---|---|---|
| 2013/0325323 A1* | 12/2013 | Breed | G01C 21/3667 |
| | | | 701/420 |
| 2016/0368502 A1 | 12/2016 | Suzuki et al. | |
| 2017/0174210 A1* | 6/2017 | Choi | B60W 30/08 |
| 2017/0369028 A1* | 12/2017 | Patterson | B60R 21/38 |
| 2018/0144369 A1* | 5/2018 | Pouliot | G08G 1/161 |
| 2019/0168705 A1* | 6/2019 | Springsklee | E05D 3/147 |
| 2019/0212138 A1* | 7/2019 | Hanatsuka | B60W 40/068 |

\* cited by examiner

COLLISION DETECTING DEVICE

CROSS REFERENCE TO RELATED APPLICATION

The present application is a continuation application of International Patent application No. PCT/JP2018/026369 filed on Jul. 12, 2018, which designated the U.S. and claims the benefit of priority from Japanese Patent Application No. 2017-137145 filed on Jul. 13, 2017. The entire disclosures of all of the above-referenced applications are incorporated herein by reference.

FIELD

The present disclosure relates to a collision detecting device which detects a collision of a vehicle with a collision object such as a pedestrian or a cyclist.

BACKGROUND

Pop-up hood systems are conventionally proposed for reducing an impact on a head or the like at the time of collision of a vehicle with a collision object such as a pedestrian or a cyclist. In this system, an engine hood of the vehicle, that is, a rear end side of the hood is raised at the time of detection of the collision of the vehicle with the collision object so that the hood is easily dented by providing a space in an engine compartment. As a result, even in a vehicle in which the hood is low and a space provided in the engine compartment is small, the impact on the collision object can be mitigated by denting of the hood.

In such a system, the collision between the vehicle and the collision object is detected using, for example, an acceleration sensor as a collision sensor. When it is detected that an acceleration detected by the acceleration sensor provided in the vehicle exceeds an on-threshold value, which is predetermined to detect that the vehicle has collided with the collision object, it is detected that the vehicle has collided with the collision object.

SUMMARY

A collision detecting device according to the present disclosure is provided with a chassis-side system and a tire-side device. The chassis-side system includes a collision detection unit, a collision check unit and an operation command unit. The collision detection unit generates an output having an output value corresponding to vibration or distortion applied to the vehicle. The collision check unit detects a collision of the vehicle with a collision object by comparing the output value of the collision detection unit with a threshold value. The operation command unit outputs a drive signal for driving a protection device provided to mitigate an impact of collision applied to the collision object when the collision is detected by the collision detection unit. The tire-side device includes a vibration detection unit, a road surface check unit and a notification unit, The vibration detection unit is attached to an inner side of a tire of the vehicle and outputs a detection signal corresponding to a vibration of the tire. The road surface check unit detects a rough road surface, which has unevenness larger than that of a flat road surface, based on the detection signal of the vibration detection unit generated in one rotation of the tire. The notification unit transmits data indicating the rough road surface to the chassis-side system when the rough road surface is detected by the road surface check unit.

EMBODIMENT

Hereinafter, embodiments of the present disclosure will be described with reference to the accompanying drawings. In each embodiment described below, same or equivalent parts are designated with the same reference numerals for simplification of description.

First Embodiment

A pop-up hood system 100 to which a collision detecting device according to the present embodiment is applied will be described with reference to FIG. 1 to FIG. 6. The pop-up hood system 100 detects a collision between a vehicle and a collision object such as a pedestrian or a cyclist, and executes pop-up hood control to raise a rear end of a hood covering an engine compartment of the vehicle to protect the collision object.

Figure 1:
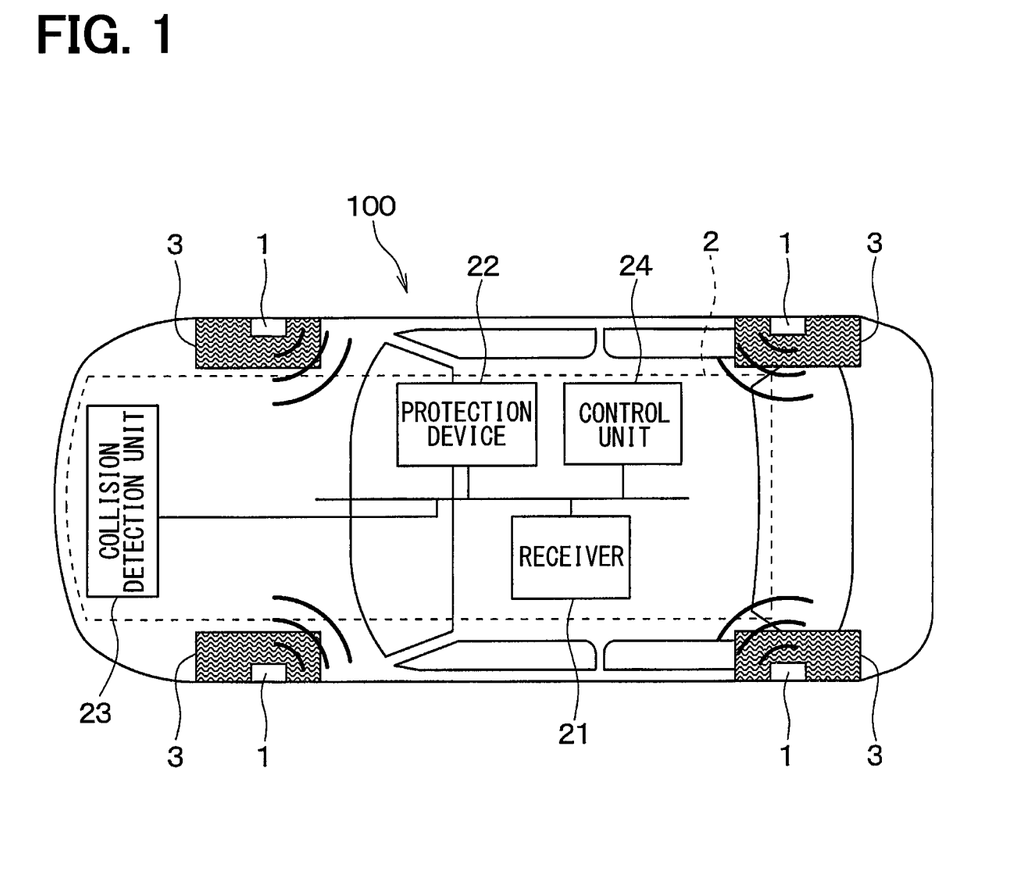
FIG. 1 is a schematic view of a vehicle including a pop-up hood system to which a collision detecting device according to a first embodiment is applied.
Figure 2:
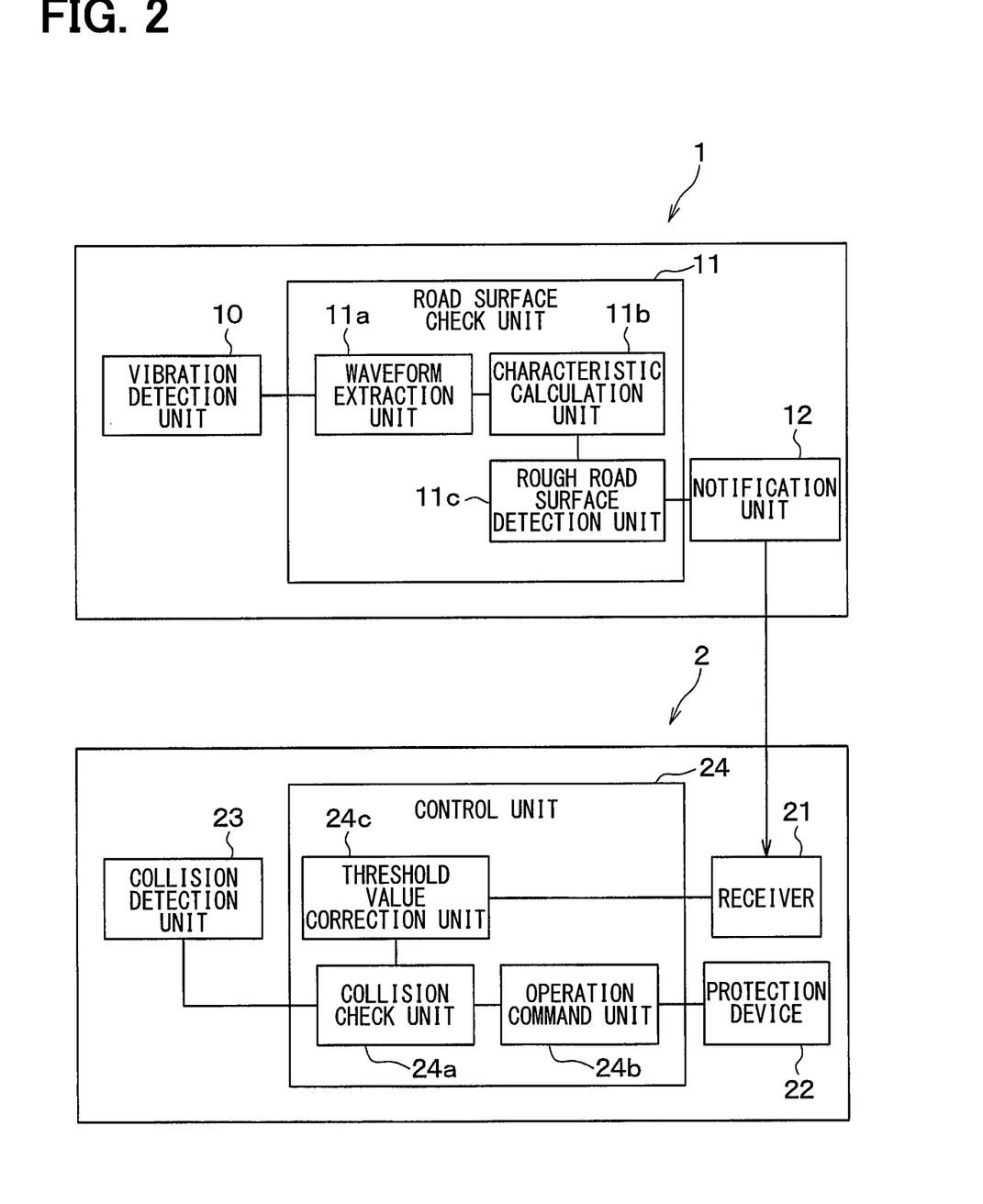
FIG. 2 is a block diagram of the pop-up hood system shown in FIG. 1.

As shown in FIG. 1 and FIG. 2, the pop-up hood system 100 is configured to have a tire-side device 1 provided on a tire wheel side of the vehicle and chassis-side system 2 of the vehicle, which includes various parts provided on the vehicle chassis side. The chassis-side system 2 includes, for example, a receiver 21, a collision detection unit 23, a control unit 24 and the like.

In the pop-up hood system 100, the tire-side device 1 processes data corresponding to a road surface condition of a traveling road of the tire 3 (hereinafter referred to as road surface data), detects a rough road surface based on a data processing result, and transmits a detection result to the chassis-side system 2. In addition, the chassis-side system 2 detects that the vehicle has collide with the collision object, and operates a protection device 22 when the collision is detected. Thus, the impact on the collision object is mitigated to thereby protect the collision object. At this time, the detection of the collision between the vehicle and the collision object is performed by using a predetermined on-threshold value. By changing the setting of the on-threshold value to a higher value at the time of reception of the detection result of the rough road surface from the tire-side device 1, it is possible to detect the collision more accurately.

Here, the rough road surface means a road surface, which has large unevenness on a road top surface compared with a flat road. The rough road is exemplified as a dirt road such as an unpaved road in mountains, forests or wilderness, and gravel road. The flat road is exemplified as a paved road such as an asphalt road. When the vehicle travels on the rough road, vibrations due to unevenness of the road surface or due to collisions of flying pebbles occur.

Hereinafter, detailed configurations of the tire-side device 1 and the chassis-side system 2 will be described.

Figure 3:
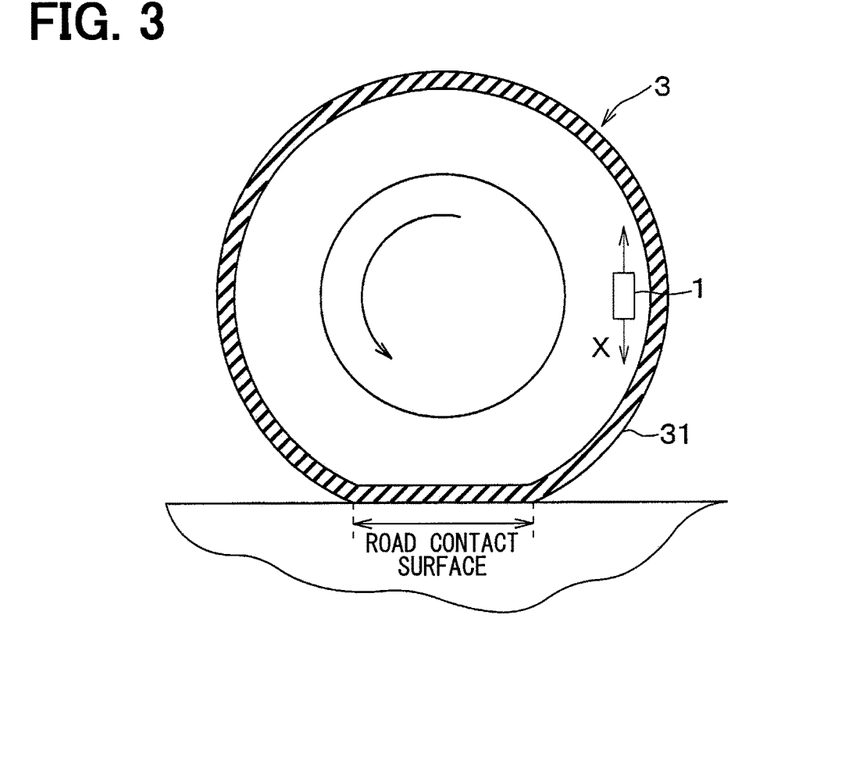
FIG. 3 is a schematic view showing in cross section a tire of a vehicle to which a tire-side device is attached.

The tire-side device 1 is configured to include a vibration detection unit 10, a road surface check unit 11 and a notification unit 12, and provided at an inside surface side of a tread of the tire 3 as shown in FIG. 3.

The vibration detection unit 10 is for detecting vibration applied to the tire 3, and outputs a detection signal corresponding to the vibration applied to and received by the tire 3. Since the detection signal of the vibration detection unit 10 is data reflecting the vibration of the tire 3 corresponding to the road surface condition of the traveling road surface, it can be used as road surface data.

For example, the vibration detection unit 10 is formed of an acceleration sensor. In case that the vibration detection unit 10 is the acceleration sensor, the vibration detection unit 10 outputs a detection signal of acceleration as the detection signal, which corresponds to the vibration in a direction tangential to a circular trajectory drawn up by the tire-side device 1 at the time of rotation of the tire 3, that is, a tire tangential direction indicated by an arrow X in FIG. 3

The road surface check unit 11 is formed of a well-known microcomputer including a CPU, a ROM, a RAM, an I/O, etc., and is a part which detects the rough road surface by executing various processes defined by a program stored in the ROM. The road surface check unit 11 is configured to include a waveform extraction unit 11a, a characteristic calculation unit 11b and a rough road surface detection unit 11c as functional units that perform those processes. These units 11a, 11b and 11c correspond to software processes of waveform extraction, characteristic calculation and rough road surface detection, which are executed by the microcomputer, respectively.

The waveform extraction unit 11a processes the detection signal by using the detection signal output from the vibration detection unit 10 as the detection signal representing the vibration data in the tire tangential direction, so that the vibration waveform in a predetermined period during one rotation of the tire 3 is extracted. Then, the waveform extraction unit 11a transmits an extracted vibration waveform to the characteristic calculation unit 11b.

Figure 4:
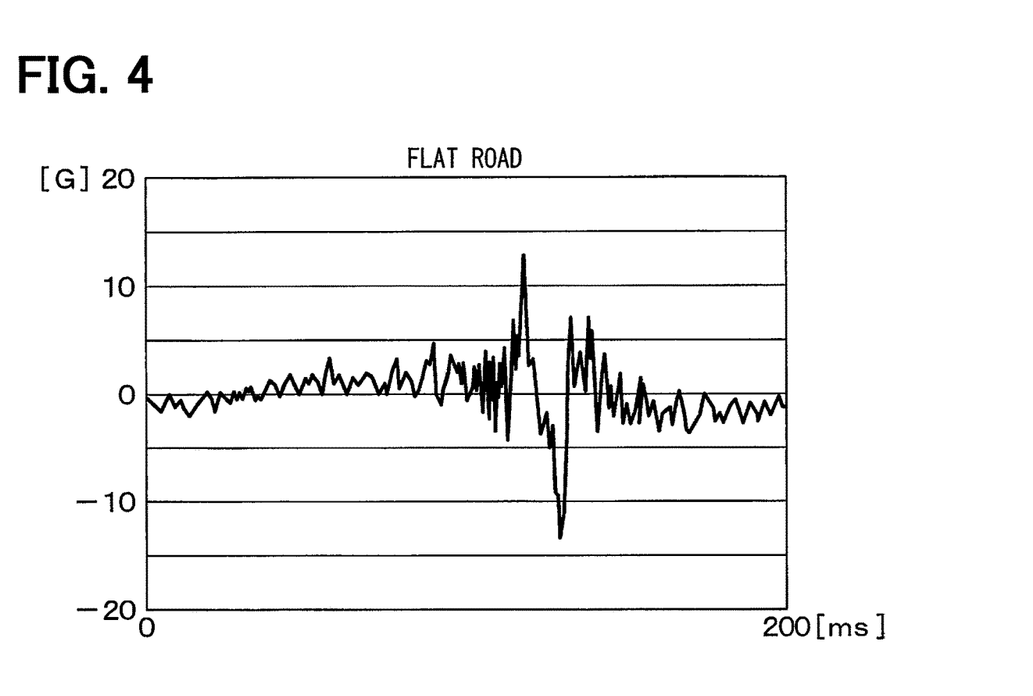
FIG. 4 is an output voltage waveform chart of a vibration detection unit at the time of tire rotation on a flat road surface.
Figure 5:
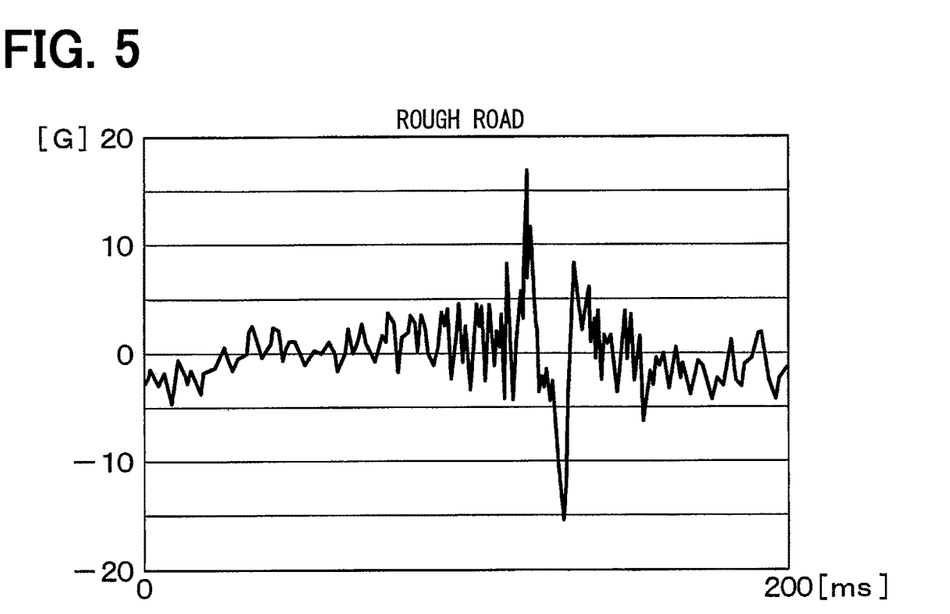
FIG. 5 is an output voltage waveform chart of the vibration detection unit at the time of tire rotation on a rough road surface.

For example, an output voltage waveform of the detection signal of the vibration detection unit 10 output at the time of tire rotation changes as shown in FIG. 4 and FIG. 5. FIG. 4 shows an output voltage waveform for one rotation of the tire 3 on a flat road surface. FIG. 5 shows an output voltage waveform for one rotation of the tire 3 on a rough road surface.

As shown in these figures, the output voltage of the vibration detection unit 10 has a maximum value at a contact start time when a portion of the tread 31 of the tire 3 corresponding to the vibration detection unit 10 starts to contact the ground with the rotation of the tire 3. Hereinafter, a peak value at the start of contacting the ground where the output voltage of the vibration detection unit 10 has the maximum value is referred to as a first peak value. As shown in these figures, the output voltage of the vibration detection unit 10 has a minimum value at a contact end time when the portion of the tread 31 of the tire 3 corresponding to the position of the vibration detection unit 10 is changed from a state contacting the ground to a state not contacting the ground with the rotation of the tire 3. Hereinafter, this peak value at the end of contacting the ground where the output voltage of the vibration detection unit 10 has the minimum value is referred to as a second peak value.

The output voltage of the vibration detection unit 10 takes the peak values at the above-described timings for the following reasons. When the portion of the tread 31 corresponding to the position of the vibration detection unit 10 contacts the ground with the rotation of the tire 3, a portion of the tire 3, which had a substantially cylindrical surface, is pressed to be deformed into a flat shape in the vicinity of the vibration detection unit 10. With reception of an impact at this time, the output voltage of the vibration detection unit 10 takes the first peak value. When the portion of the tread 31 corresponding to the position of the vibration detection unit 10 is separated from the ground with the rotation of the tire 3, the pressing of the portion of the tire 3 is released in the vicinity of the vibration detection unit 10, and the flat shape of the portion of the tire 3 returns to the substantially cylindrical shape. With reception of an impact at the time of restoring the original shape of the tire 3, the output voltage of the vibration detection unit 10 takes the second peak value. As described above, the output voltage of the vibration detection unit 10 takes the first peak value and the second peak value at the ground contact start time and the ground contact end time, respectively. Since a direction of the impact at the time when the tire 3 is pressed and a direction of the impact at the time when the tire 3 is released from pressurization are opposite, polarities of the output voltages are also opposite.

In the output voltage waveform which the detection signal of the vibration detection unit 10 shows as described above, magnitude of the vibration differs between the flat road surface and the rough road surface. This difference in vibration appears in any period during one rotation of the tire 3. For this reason, the waveform extraction unit 11a is configured to extract a vibration waveform in a predetermined period during one rotation of the tire 3. This predetermined period may be a specific period determined during one rotation of the tire 3, or may be a whole period during one rotation of the tire 3, or any partial period during one rotation of the tire 3.

The characteristic calculation unit 11b calculates a frequency characteristic of the vibration of the tire 3 based on the vibration waveform in a predetermined period during one rotation of the tire 3 extracted by the waveform extraction unit 11a. For example, the characteristic calculation unit 11b calculates the frequency characteristic of the vibration of the tire 3, for example, an amplitude level value of each frequency component, by performing Fourier transform such as FFT (Fast Fourier Transform).

Figure 6:
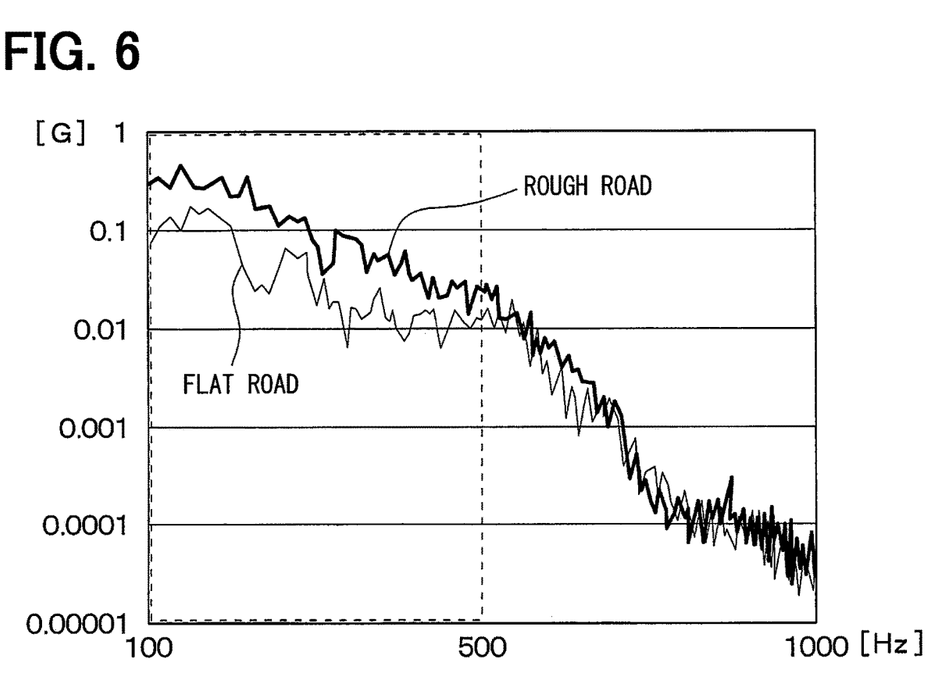
FIG. 6 is a graph showing frequency analysis results of a flat road surface and a rough road surface.

For example, the output voltage waveform for one rotation of the tire 3 on the flat road surface and the rough road surface shown in FIG. 4 and FIG. 5 described above, respectively, has the frequency spectrum of each frequency component as shown in FIG. 6. Since the vibrations of the output voltage waveforms of the vibration detection unit 10 thus differ between the flat road surface and the rough road surface, the frequency characteristics of the vibration of the tire 3 calculated from the detection signal of the vibration detection unit 10 also become different. In particular, since the frequency characteristic in the frequency band of 100 Hz to 500 Hz is likely to change in correspondence to the road surface condition, the difference in the frequency characteristics between the flat road surface and the rough road surface becomes large in such a frequency band. Therefore, the characteristic calculation unit 11b calculates the frequency characteristic in the frequency band of 100 Hz to 500 Hz.

Although the amplitude level value of each frequency component is calculated as the frequency characteristic in the tire-side device 1, this is only one example. Alternatively, an integrated value of the amplitude level value of the component of 100 to 500 Hz in the detection signal of the vibration detection unit 10 in the predetermined period during one rotation of the tire 3 may be calculated, or an average value of the amplitude level values in such a frequency band may be calculated. Of course, it is not necessary to set a whole frequency band of 100 Hz to 500 Hz. It is also possible to calculate the integrated value or the average value of the amplitude level values in a frequency band including at least a part of the frequency band of 100 Hz to 500 Hz.

The rough road surface detection unit 11c detects that the road surface condition is a rough road surface based on the frequency characteristic calculated by the characteristic calculation unit 11b, and transmits such data as indicating the detection result of the rough road surface. For example, the rough road detection unit 11c detects that the road condition is the rough road surface if the amplitude level value of each frequency component calculated by the characteristic calculation unit 11b exceeds a threshold value predetermined to check the road surface condition. Also, as described above, in case of using the integrated value or the average value of the amplitude level values of at least a part of the frequency band of 100 Hz to 500 Hz, the rough road detection unit 11c detects that the road surface condition is the rough road surface if the integrated value or the average value exceeds each threshold value provided for such an integrated value or an average value.

The notification unit 12 is a unit that performs data transmission. For example, when data indicating a detection of the rough road surface is transmitted from the rough road surface detection unit 11c, the notification unit 12 performs a function of transmitting such data to the chassis-side system 2. Although the timing of data transmission from the notification unit 12 is arbitrary, the data transmission may be performed immediately when the rough road surface is detected, or only when the rough road surface continues during a plurality of rotations of the tire 3.

It is noted that even in case the road surface is determined to be rough, the degree of roughness may differ. Therefore, when the rough road surface is detected by the characteristic calculation unit 11b, data indicating the degree of roughness may also be transmitted so that such data may also be transmitted from the notification unit 12. For example, since the magnitude of the frequency spectrum calculated by the characteristic calculation unit 11b corresponds to the degree of roughness, data indicating the degree of roughness may be generated in accordance with the magnitude of the frequency spectrum and transmitted from the notification unit 12.

In addition, in case that the rough road surface detection unit 11c does not detect that the road surface is rough, the notification unit 12 does not transmit data indicating that the road surface is rough, so that the chassis-side system 2 may recognize no rough road surface.

Here, the notification unit 12 transmits data indicating that the road surface is rough to the chassis-side system 2 only when the rough road surface detection unit 11c detects that the road surface is rough. Alternatively, the notification unit 12 may expressly transmit data indicating that no rough road surface is detected. As described later, the on-threshold value used for detecting a collision between the vehicle and the collision object is corrected in case of the detection of the rough road surface. However, it is preferred to return the on-threshold value which is corrected for the rough road surface to the value which is used before the correction, when the road surface is not rough. For this reason, in case the rough road surface is not detected, it is possible to quickly return the on-threshold value to the value when the rough road surface is not detected, by transmitting data indicating no rough road surface to the chassis-side system 2.

As shown in FIG. 1 and described above, the chassis-side system 2 is configured to have the receiver 21, the protection device 22, the collision detection unit 23, the control unit 24 and the like.

The receiver 21 receives the data transmitted from the notification unit 12 and transmits such data to the control unit 24.

The protection device 22 is driven to protect the collision object which has collided with the vehicle. In case of the pop-up hood system 100 as in the present embodiment, an actuator or the like that raises the rear end of the hood corresponds to the protection device 22. Although various actuators can be applied as the actuator for raising the rear end of the hood, for example, a lifting device disposed at the left and right rear ends of the hood is applied. The protection device 22 is controlled by the control unit 24 described later. The protection device 22 alleviates the impact generated by the collision and given to the collision object by raising the rear end of the hood in response to the drive signal from the control unit 24.

The collision detection unit 23 generates an output corresponding to the vibration or strain applied to the vehicle in order to detect a collision between the vehicle and the collision object, and is provided in a chassis of the vehicle such as a bumper. Specifically, the collision detection unit 23 generates, as an output, a detection signal corresponding to the vibration or strain applied to the vehicle. For example, the collision detection unit 23 is configured by an acceleration sensor, and generates a detection signal corresponding to the acceleration generated on the vehicle. When the vehicle collides with something, an acceleration corresponding to the collision is generated, and hence the collision can be detected based on the detection signal of the acceleration sensor.

The detection signal of the collision detection unit 23 is output as an output voltage, for example. An output value of the collision detection unit 23 is a value indicated by the detection signal. In case the detection signal is represented by the output voltage, it means the output voltage.

Moreover, although the acceleration sensor is exemplified as the collision detection unit 23, any other devices or sensors usable for collision detection may be used. For example, a film type sensor composed of a piezoelectric film or the like which may be attached to a bumper cover or the like, a pressure sensor for detecting pressure applied to the chassis of the vehicle and the like can also be used as components operable as the collision detection unit 23. Even in case that the collision detection unit 23 is configured by a film type sensor, a pressure sensor or the like, a detection signal corresponding to the vibration or strain applied to the vehicle is generated and hence used in the similar way as the acceleration sensor.

The control unit 24 detects a collision between the vehicle and the collision object based on the detection signal indicating the output value of the collision detection unit 23.

Further, when a collision between the vehicle and the collision object is detected, the control unit 24 outputs the drive signal to the protection device 22 to drive the protection device 22. The control unit 24 is configured by a microcomputer similarly to the road surface check unit 11 in the tire-side device 1. The microcomputer operating as the control unit 24 executes software processes, which correspond to and indicated as a collision check unit 24a, an operation command unit 24b and a threshold value correction unit 24c in FIG. 2.

The collision check unit 24a processes the detection signal transmitted from the collision detection unit 23 to acquire a measurement value of the output value of the collision detection unit 23, that is, a value corresponding to the vibration or distortion of the vehicle, and detects the collision between the vehicle and the collision object by comparing the measurement value with the on-threshold value. Specifically, when the measurement value exceeds the on-threshold value, the collision determination unit 24a detects that the vehicle collides with the collision object, and transmits the signal indicating the collision to the operation command unit 24b. For example, in case that the collision detection unit 23 is configured by the acceleration sensor as described above, the value corresponding to the vibration or strain of the vehicle is represented as the acceleration, and hence the acceleration is used as the measurement value. Similarly, even in case that the collision detection unit 23 is configured by the film type sensor or the pressure sensor, a value corresponding to the vibration or strain of the vehicle indicated by the detection signal of each sensor is used as the measurement value.

The operation command unit 24b outputs the drive signal for driving the protection device 22 based on a determination result of the collision check unit 24a. Specifically, upon receiving a signal indicating that the collision between the vehicle and the collision object has been detected from the collision check unit 24a as described above, the operation command unit 24b outputs the drive signal to the protection device 22.

The threshold value correction unit 24c corrects the on-threshold value based on the data received by the receiver 21, that is, the data transmitted from the notification unit 12 of the tire-side device 1. When the data indicating that the road surface is rough is transmitted to the threshold value correction unit 24c from the notification unit 12, the on-threshold value is increased and corrected to the value for the rough road surface. Although it is preferable to set the on-threshold to a small value so that the collision can be detected more sensitively on the flat road, setting it to such a small value may cause a false collision detection on the rough road surface. For this reason, it may be a fixed value which is somewhat a large value. However, in case that the rough road surface can be detected as in the present embodiment, the on-threshold value can be made different and set between the rough road surface and the other road surfaces. For this reason, by correcting the on-threshold value to a large value when the rough road surface is detected as compared with the case where the rough road surface is not detected, the collision can be detected sensitively on the flat road while alleviating an erroneous detection of the collision on the rough road surface.

Here, when the rough road surface is detected, the threshold correction unit 24c corrects the on-threshold value to a large value as compared with the case where the rough road surface is not detected. However, this is merely an example. For example, when the tire-side device 1 transmits the data indicating the degree of roughness of the rough road, the on-threshold value may be set variably based on the degree of roughness. That is, the on-threshold value may be set to a larger value as the degree of roughness is larger.

Thus, when the on-threshold value is corrected by the threshold value correction unit 24c, the collision check unit 24a detects the collision between the vehicle and the collision object using the corrected on-threshold value. For this reason, it becomes possible to suppress the erroneous detection on the rough road surface while detecting the collision sensitively on the flat road. For this reason, it becomes possible to suppress erroneous detection on the rough road while detecting the collision sensitively on the flat road.

The pop-up hood system 100 is configured as described above in the present embodiment. Each unit 21 to 24 forming the chassis-side system 2 is connected through an in-vehicle LAN (Local Area Network) like CAN (Controller Area Network) communication. Thus each unit is capable of communicating information mutually through the in-vehicle LAN.

It is noted that it is necessary not to detect erroneously that the vehicle has collided with the collision object by the acceleration generated by flying pebbles or the like when the vehicle travels on a rough road.

For this reason, it is conventionally proposed to detect a tire air pressure by an air pressure sensor provided in the tire and determine that the road condition the vehicle is traveling is the rough road surface based on a change in tire air pressure. When the road surface is rough, the on-threshold value is corrected to a large value. As a result, it is possible to suppress erroneous detection that the vehicle has collided with the collision object based on the acceleration generated when the vehicle travels on the rough road or a pebble or the like.

However, since the tire air pressure does not change so much depending on the unevenness of the road surface on the rough road surface, it cannot be accurately detected that the road surface is rough road based on the tire air pressure detected by the air pressure sensor.

Differently from the conventional device described above, the collision detecting device according to the present embodiment applied to the pop-up hood system 100 corrects the on-threshold value, which the collision check unit 24a uses to compare the measurement value corresponding to the vibration or distortion of the vehicle, to the value larger than that used in case of the flat road surface, when the tire-side device 1 detects that the road surface is rough. For this reason, it becomes possible to suppress the erroneous detection on the rough road surface while detecting the collision sensitively on the flat road.

The rough road surface is detected by the vibration detection unit 10 provided in the tire-side device 1. That is, the rough road surface is detected by the vibration detection unit 10 which detects the vibration in the tangential direction of the tire 3 like an acceleration sensor. Since the road surface condition is reflected in the detection signal of the vibration detection unit 10, the vibration detection unit 10 can accurately detect the rough road surface. Therefore, it becomes possible to appropriately correct the on-threshold value on the rough road surface, and it is possible to detect the collision between the vehicle and the collision object more accurately even on the rough road surface or the like.

Second Embodiment

A second embodiment will be described next. The present embodiment is different from the first embodiment in the configuration of the control unit 24 in the chassis-side system 2 and the other configurations are similar to the first embodiment, so only the difference from the first embodiment will be described.

In the first embodiment, by correcting the on-threshold value, the collision between the vehicle and the collision object is made to be accurately detected even on the rough road surface. On the other hand, in the present embodiment, the output of the collision detection unit 23 which is compared with the on-threshold value is corrected.

Figure 7:
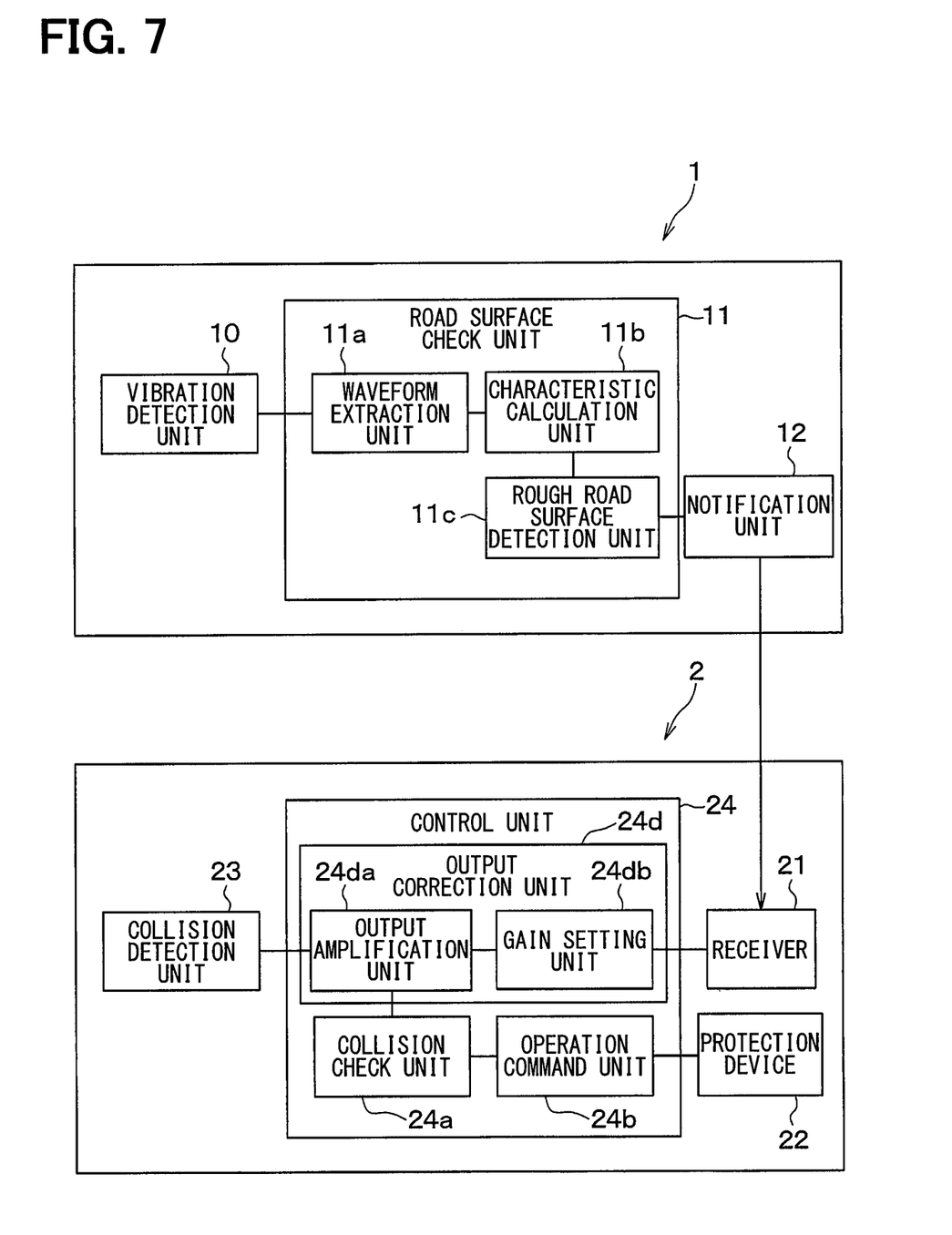
FIG. 7 is a block diagram of a pop-up hood system to which a collision detecting device according to a second embodiment is applied.

As shown in FIG. 7, in the present embodiment, the control unit 24 in the chassis-side system 2 is configured to include an output correction unit 24d in addition to the collision check unit 24a and the operation command unit 24b. The output correction unit 24d is provided instead of the threshold value correction unit 24c provided in the first embodiment. The collision check unit 24a and the operation command unit 24b are the same as in the first embodiment.

The output correction unit 24d receives the detection signal output from the collision detection unit 23 and the data received by the receiver 21 from the notification unit 12 of the tire-side device 1, and corrects the output value of the collision detection unit 23 in accordance with the road surface condition. Specifically, in case that the receiver 21 receives the data indicating that the road surface is rough, the output correction unit 24d corrects the output value of the collision detection unit 23 to be smaller than in case of the flat road surface.

For example, as shown in FIG. 7, the output correction unit 24d is configured to include an output amplification unit 24da and an amplification gain setting unit 24db. After the output of the collision detection unit 23 is amplified by the output amplification unit 24da such as an amplifier, the output value of the output amplification unit 24da is compared with the on-threshold value in the collision check unit 24a. In this case, the output correction unit 24d is provided with the amplification gain setting unit 24db for setting the amplification gain of the output amplification unit 24da, and the amplification gain setting unit 24db corrects the amplification gain of the output amplification unit 24da to be smaller in case of the rough road surface than in case of the flat road surface. Thus, by providing the output correction unit 24d with the amplification gain setting unit 24db and correcting the amplification gain in the output amplification unit 24da, the output value of the collision detection unit 23 is corrected in correspondence to the rough road surface.

As described above, by correcting the output value of the collision detection unit 23 in case of the rough road surface to be smaller than that in case of the flat road surface, the same effect as that of the first embodiment can be provided.

Third Embodiment

A third embodiment will be described next. The present embodiment is different from the second embodiment in processing of the tire-side device 1 and the correction method in the output correction unit 24d and the other parts are similar to the second embodiment, so only the difference from the second embodiment will be described.

The vibration generated by unevenness of a road surface and applied to the vehicle is attenuated by a suspension or the like but the frequency band of the vibration is the same frequency band as the vibration generated by the unevenness of the road surface and applied to the tire 3. For this reason, in the tire-side device 1, the characteristic calculation unit 11b calculates the frequency band of vibration applied to the tire 3 based on the unevenness of the road surface (hereinafter referred to as noise frequency band) as the frequency characteristic of vibration of the tire 3. Then, the data of the noise frequency band calculated by the characteristic calculation unit 11b is transmitted from the notification unit 12 of the tire-side device 1 to the chassis-side system 2. Based on this, in the chassis-side system 2, the output correction unit 24d removes vibration components of the noise frequency band from the output of the collision detection unit 23, and the collision check unit 24a compares a corrected output value, which is the output value after removal, with the on-threshold value.

As described above, it is assumed in the present embodiment that the frequency band of vibration generated by the unevenness of the road surface and applied to the tire 3 is the noise frequency band. The vibration component of the noise frequency band is removed from the detection signal of the collision detection unit 23 and the noise-removed output is compared with the on-threshold value. Thus the third embodiment also provides the same effect as the second embodiment.

Other Embodiment

Although the present disclosure is made based on the embodiments described above, the present disclosure is not limited to such embodiments but includes various changes and modifications which are within equivalent ranges. In addition, while various combinations and configurations, which are preferred, other combinations and configurations including further only a single element, more or less, are also within the spirit and scope of the present disclosure.

For example, although the acceleration sensor is exemplified as the vibration detection unit 10, any other sensors may be used as long as such a sensor outputs a detection signal indicating the vibration in the tire tangential direction. For example, a vibration power generation element may be used as the vibration detection unit 10. The vibration power generation element may be an electrostatic induction type power generation element (for example, electret), a piezoelectric element, a friction type element, a magnetostrictive type element or an electromagnetic induction type element. In case of using the vibration power generation element, it is possible to convert vibration energy into electric energy and generate the power for the tire-side device 1 based on the converted electric energy in addition to outputting the detection signal corresponding to the vibration in the tangential direction of the tire.

Moreover, although the functional parts of the road surface check unit 11 of the tire-side device 1 and the control unit 24 of the chassis-side system 2 are exemplarily shown in block forms, the configuration is not limited to such a configuration described above and may be configured differently as long as the functions described above are performed. For example, with respect to the control unit 24 of the chassis-side system 2, it may be configured with a plurality of electronic control units (hereinafter, ECUs), which cooperatively performs the corresponding functions of the system 2, respectively.

The vibration occurring in the tire 3 varies with the vehicle speed. Specifically, the vibration of the tire 3 becomes greater with an increase of the vehicle speed even on the same road surface condition. Therefore, since the high frequency components included in the detection signal of the vibration detection unit 10 increase as the vehicle speed increases, the threshold value used for comparison with the frequency characteristic in detecting the rough road surface may be varied in accordance with the vehicle speed. For example, the threshold value to be used for comparison with the frequency spectrum calculated by the characteristic calculation unit 11*b* may be increased with an increase in the vehicle speed.

What is claimed is:

1. A collision detecting device comprising:
   a chassis-side system provided in a chassis of a vehicle and including a collision detection unit and a control unit, the control unit configured to execute a collision check process and an operation command process,
   wherein the collision detection unit generates an output having an output value corresponding to vibration or distortion applied to the vehicle, the collision check process detects a collision of the vehicle with a collision object by comparing the output value of the collision detection unit with a threshold value, the operation command process outputs a drive signal for driving a protection device provided to mitigate an impact of collision applied to the collision object when the collision is detected by the collision detection unit; and
   a tire-side device including a vibration detection unit, a road surface check unit configured to execute a road surface check process, and a notification unit,
   wherein the vibration detection unit is attached to an inner side of a tire of the vehicle and outputs a detection signal corresponding to a vibration of the tire, the road surface check process detects a rough road surface, which has unevenness larger than that of a flat road surface, based on the detection signal of the vibration detection unit generated in one rotation of the tire, and the notification unit transmits data indicating the rough road surface when the rough road surface is detected by the road surface check unit,
   wherein the chassis-side system further includes a receiver and the control unit is further configured to execute a threshold value correction process, the receiver receives the data indicating the rough road surface, and the threshold value correction process corrects, in response to the data indicating the rough road surface transmitted to the receiver, the threshold value, which is used to compare the output value of the collision detection unit, to be larger than that used in case of the flat road surface.

2. The collision detecting device according to claim 1, wherein:
   the road surface check process extracts a vibration waveform of one rotation of the tire or of a specified period of one rotation of the tire indicated by the detection signal of the vibration detection unit, and detects the rough road surface based on an amplitude level value of each frequency component of the extracted vibration waveform.

3. The collision detecting device according to claim 1, wherein:
   the road surface check process extracts a vibration waveform of one rotation of the tire or of a specified period of one rotation of the tire indicated by the detection signal of the vibration detection unit, calculates an integration value of amplitude level values of a frequency band including at least a part of a frequency band in a range from 100 Hz to 500 Hz in the extracted vibration waveform, and detects the rough road surface when the integration value exceeds a predetermined threshold value.

4. A collision detecting device comprising:
   a chassis-side system provided in a chassis of a vehicle and including a collision detection unit and a control unit, the control unit configured to execute a collision check process and an operation command process,
   wherein the collision detection unit generates an output having an output value corresponding to vibration or distortion applied to the vehicle, the collision check process detects a collision of the vehicle with a collision object by comparing the output value of the collision detection unit with a threshold value, the operation command process outputs a drive signal for driving a protection device provided to mitigate an impact of collision applied to the collision object when the collision is detected by the collision detection unit; and
   a tire-side device including a vibration detection unit, a road surface check unit configured to execute a road surface check process, and a notification unit,
   wherein the vibration detection unit is attached to an inner side of a tire of the vehicle and outputs a detection signal corresponding to a vibration of the tire, the road surface check process detects a rough road surface, which has unevenness larger than that of a flat road surface, based on the detection signal of the vibration detection unit generated in one rotation of the tire, and the notification unit transmits data indicating the rough road surface when the rough road surface is detected by the road surface check process,
   wherein the chassis-side system further includes a receiver and the control unit is further configured to execute an output correction process, the receiver receives the data indicating the rough road surface, and the output correction process corrects, in response to the data indicating the rough road surface transmitted to the receiver, the output value of the collision detection unit to be smaller than that in case of no transmission of the data.

5. The collision detecting device according to claim 4, wherein:
   the output correction process includes an output amplification process for amplifying an output of the collision detection unit and an amplification gain setting process for setting an amplification gain of the output amplification process;
   the collision check process compares an output value after amplification by the output amplification process as the output value of the collision check process with the threshold value; and
   the output correction process corrects the output value of the collision detection unit to be smaller in response to the data received by the receiver and indicating the rough road surface by setting the amplification gain of the output amplification process to a smaller value than in case of no reception of the data.

6. The collision detecting device according to claim 5, wherein:
   the road surface check process extracts a vibration waveform of one rotation of the tire or of a specified period of one rotation of the tire indicated by the detection signal of the vibration detection unit, and detects the rough road surface based on an amplitude level value of each frequency component of the extracted vibration waveform.

7. The collision detecting device according to claim 5, wherein:
   the road surface check process extracts a vibration waveform of one rotation of the tire or of a specified period of one rotation of the tire indicated by the detection signal of the vibration detection unit, calculates an integration value of amplitude level values of a frequency band including at least a part of a frequency band in a range from 100 Hz to 500 Hz in the extracted vibration waveform, and detects the rough road surface when the integration value exceeds a predetermined threshold value.

8. The collision detecting device according to claim 4, wherein:
the road surface check process extracts a vibration waveform of one rotation of the tire or of a specified period of one rotation of the tire indicated by the detection signal of the vibration detection unit, and detects the rough road surface based on an amplitude level value of each frequency component of the extracted vibration waveform.

9. The collision detecting device according to claim 4, wherein:
the road surface check process extracts a vibration waveform of one rotation of the tire or of a specified period of one rotation of the tire indicated by the detection signal of the vibration detection unit, calculates an integration value of amplitude level values of a frequency band including at least a part of a frequency band in a range from 100 Hz to 500 Hz in the extracted vibration waveform, and detects the rough road surface when the integration value exceeds a predetermined threshold value.

10. A collision detecting device comprising:
a chassis-side system provided in a chassis of a vehicle and including a collision detection unit and a control unit, the control unit configured to execute a collision check process and an operation command process,
wherein the collision detection unit generates an output having an output value corresponding to vibration or distortion applied to the vehicle, the collision check process detects a collision of the vehicle with a collision object by comparing the output value of the collision detection unit with a threshold value, the operation command process outputs a drive signal for driving a protection device provided to mitigate an impact of collision applied to the collision object when the collision is detected by the collision detection unit; and
a tire-side device including a vibration detection unit, a road surface check unit configured to execute a road surface check process, and a notification unit,
wherein the vibration detection unit is attached to an inner side of a tire of the vehicle and outputs a detection signal corresponding to a vibration of the tire, the road surface check process detects a rough road surface, which has unevenness larger than that of a flat road surface, based on the detection signal of the vibration detection unit generated in one rotation of the tire, and the notification unit transmits data of a noise frequency indicating a frequency band of vibration applied to the tire and included in the detection signal of the vibration detection unit when the rough road surface is detected by the road surface check process,
wherein the chassis-side system further includes a receiver and an output correction unit configured to execute an output correction process, the receiver receives the data of the noise frequency band, and the output correction process removes vibration components of the noise frequency band from the output of the collision detection unit to generate a corrected output value to be used for comparison with the threshold value when the receiver receives the data of the noise frequency band.

* * * * *